(12) United States Patent  (10) Patent No.:  US 8,639,420 B2
Corcoran et al.  (45) Date of Patent:  Jan. 28, 2014

(54) WORKSITE-MANAGEMENT SYSTEM

(75) Inventors: Paul Thomas Corcoran, Washington, IL (US); Allen John DeClerk, Princeton, IL (US); Katherine Christine Braddy, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 360 days.

(21) Appl. No.: 12/980,935

(22) Filed: Dec. 29, 2010

(65) Prior Publication Data

US 2012/0173090 A1  Jul. 5, 2012

(51) Int. Cl.
*G06F 7/70*  (2006.01)

(52) U.S. Cl.
USPC ............................................. 701/50; 404/117

(58) Field of Classification Search
USPC ...................................... 701/50, 469; 404/117
See application file for complete search history.

(56) References Cited

U.S. PATENT DOCUMENTS

| | | | |
|---|---|---|---|
| 5,479,992 A | 1/1996 | Bassett | |
| 5,646,844 A | 7/1997 | Gudat et al. | |
| 6,188,942 B1 | 2/2001 | Corcoran et al. | |
| 6,236,923 B1 | 5/2001 | Corcoran et al. | |
| 6,460,006 B1 | 10/2002 | Corcoran | |
| 6,681,157 B2 | 1/2004 | Kageyama | |
| 6,741,949 B2 | 5/2004 | Corcoran et al. | |
| 6,742,960 B2 | 6/2004 | Corcoran et al. | |
| 6,973,821 B2 | 12/2005 | Corcoran | |
| 7,191,062 B2 | 3/2007 | Chi et al. | |
| 7,302,837 B2 | 12/2007 | Wendte | |
| 7,428,455 B2 | 9/2008 | Corcoran | |
| 7,491,014 B2 | 2/2009 | Sick | |
| 7,581,452 B2 | 9/2009 | Sandomirsky et al. | |
| 7,731,450 B2 | 6/2010 | Congdon et al. | |
| 2007/0129869 A1 | 6/2007 | Gudat et al. | |
| 2007/0150147 A1 | 6/2007 | Rasmussen et al. | |
| 2007/0239336 A1 | 10/2007 | Congdon et al. | |
| 2007/0239338 A1 | 10/2007 | Potts et al. | |
| 2008/0063473 A1* | 3/2008 | Congdon et al. ................ 404/75 |
| 2008/0103835 A1 | 5/2008 | Corcoran et al. | |
| 2008/0202777 A1 | 8/2008 | Corcoran | |
| 2008/0208416 A1* | 8/2008 | Yuet et al. ....................... 701/50 |
| 2008/0267719 A1 | 10/2008 | Corcoran | |

FOREIGN PATENT DOCUMENTS

JP  2000-204515  7/2000

* cited by examiner

*Primary Examiner* — Thomas Black
*Assistant Examiner* — Luke Huynh
(74) *Attorney, Agent, or Firm* — Finnegan, Henderson, Farabow, Garrett & Dunner LLP (57) ABSTRACT

A worksite-management system includes a display component and one or more information-processors. The one or more information-processors may be configured to acquire information about a history of travel of one or more non-compactor mobile machines across a terrain surface of a worksite. The one or more information-processors may also be configured to process the acquired information to generate a digital map indicative of compaction of the terrain surface as a function of the history of travel of the one or more non-compactor mobile machines across the terrain surface. Additionally, the one or more information-processors may be configured to present on the display component information related to the compaction of the terrain surface as a function of the history of travel of the one or more non-compactor mobile machines across the terrain surface.

22 Claims, 5 Drawing Sheets

WORKSITE-MANAGEMENT SYSTEM

TECHNICAL FIELD

The present disclosure relates to managing operation of mobile machines at a worksite and, more particularly, to managing non-compactor mobile machines in a manner related to compaction of a terrain surface of the worksite.

BACKGROUND

Preparation of a terrain surface for a planned use as a building site, a roadway, a landfill, or the like often involves modifying the terrain surface to have certain specified characteristics. These characteristics may include, for example, a particular topology, a particular material composition, and/or a particular state of compaction. If the terrain surface of a worksite begins with a degree of compaction less than that required for the finished state, the worksite developer must somehow compact the terrain surface. To do so, many worksite developers employ compactor machines that are designed primarily or exclusively for the purpose of compacting surfaces, such as rollers and vibrating pans. While such machines perform the function of compacting surfaces well, using them to properly compact the terrain surface of a worksite requires effectively managing where and to what degree the compactors are used on the terrain surface.

U.S. Pat. No. 7,731,450 B2 to Congdon et al. ("the '450 patent") discusses a method of operating a compactor machine within a work area. The '450 patent discloses operating the compactor machine within the work area while sensing values indicating a degree of compaction of the surface under the compactor machine. The method disclosed by the '450 patent discloses navigating the compactor machine based on this sensed information to provide effective compaction of the work area.

Although the '450 patent discloses using sensed information to operate a compactor machine to provide effective compaction of a work area, the '450 patent may have certain shortcomings. For example, relying exclusively on a dedicated compactor machine to provide desired compaction of the work area may undesirably and unnecessarily increase costs associated with at least some worksite projects.

The worksite-management system and methods of the present disclosure may help address these shortcomings.

SUMMARY OF THE INVENTION

One disclosed embodiment relates to a worksite-management system that includes a display component and one or more information-processors. The one or more information-processors may be configured to acquire information about a history of travel of one or more non-compactor mobile machines across a terrain surface of a worksite. The one or more information-processors may also be configured to process the acquired information to generate a digital map indicative of compaction of the terrain surface as a function of the history of travel of the one or more non-compactor mobile machines across the terrain surface. Additionally, the one or more information-processors may be configured to present on the display component information related to the compaction of the terrain surface as a function of the history of travel of the one or more non-compactor mobile machines across the terrain surface.

Another embodiment relates to a method of managing compaction of a worksite. The method may include providing in memory of one or more information-processors a digital map of a terrain surface of the worksite, information related to a compaction goal for the terrain surface, and information related to a current state of compaction of the terrain surface. The method may also include using the one or more information-processors to process the digital map, the information related to the compaction goal for the terrain surface, and the information related to the current state of compaction of the terrain surface to plan a target travel path across the terrain surface for a non-compactor mobile machine.

A further disclosed embodiment relates to a mobile machine having a chassis supported from a terrain surface underlying the mobile machine. The mobile machine may be a non-compactor mobile machine. The mobile machine may include an information system configured to generate information related to compaction of the terrain surface by the non-compactor mobile machine. The information system may include a memory with a digital map of the terrain surface. The information system may also include a positioning module for acquiring information identifying a position of the non-compactor mobile machine on the terrain surface. Additionally, the information-system may include one or more processors configured to use the digital map of the terrain surface and the information identifying the position of the non-compactor mobile machine to generate information related to compaction of the terrain surface resulting from travel of the non-compactor mobile machine across the terrain surface

DETAILED DESCRIPTION

Figure 1A:
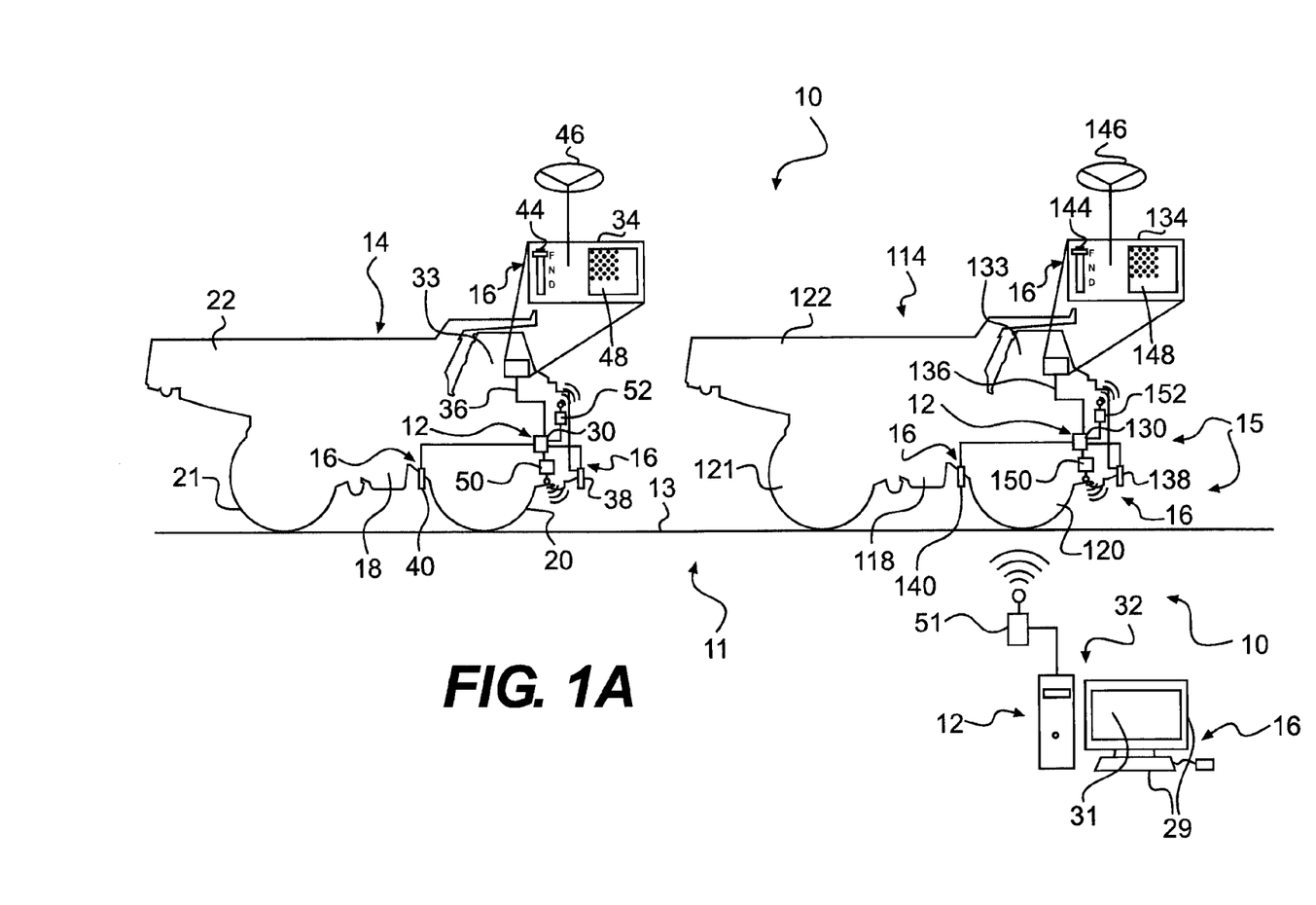
FIG. 1A shows one embodiment of a worksite-management system according to the present disclosure.

FIG. 1A illustrates one embodiment of a worksite-management system 10 according to the present disclosure. Worksite-management system 10 may include an information system 15 with one or more information-processors 12 for managing one or more aspects of the operation of machines, such as a mobile machine 14 and a mobile machine 114, at a worksite 11. Information system 15 may also include various inputs 16 from which information-processors 12 may receive information for managing operation of mobile machines 14, 114 and/or any other machines that may form part of worksite-management system 10.

Worksite-management system 10 may be configured to manage various aspects of preparation of worksite 11, including, but not limited to, compaction of a terrain surface 13 of worksite 11, excavation of worksite 11, grading of worksite 11, addition of fill or foundation materials to worksite 11, and moisture management of worksite 11. According to some disclosed embodiments, mobile machines 14, 114 may be non-compactor mobile machines, and worksite-management system 10 may be configured to manage the operation of mobile machines 14, 114 based at least in part on considerations related to compaction of various portions of worksite 11. This may include, but is not limited to, managing operation of mobile machine 14, 114 to provide desired compaction of terrain surface 13, managing the operation of mobile machined 14, 114 to avoid undesired compaction of terrain surface 13, and managing the operation of mobile machines 14, 114 to provide better operation of mobile machines 14, 114 based on information related to compaction of terrain surface 13. As used herein, "non-compactor mobile machine" refers to any mobile machine not designed primarily or exclusively for the purpose of compacting a surface. Examples of non-compactor mobile machines include, but are not limited to, hauling machines, earthmoving machines, excavators, and loaders.

Figure 1B:
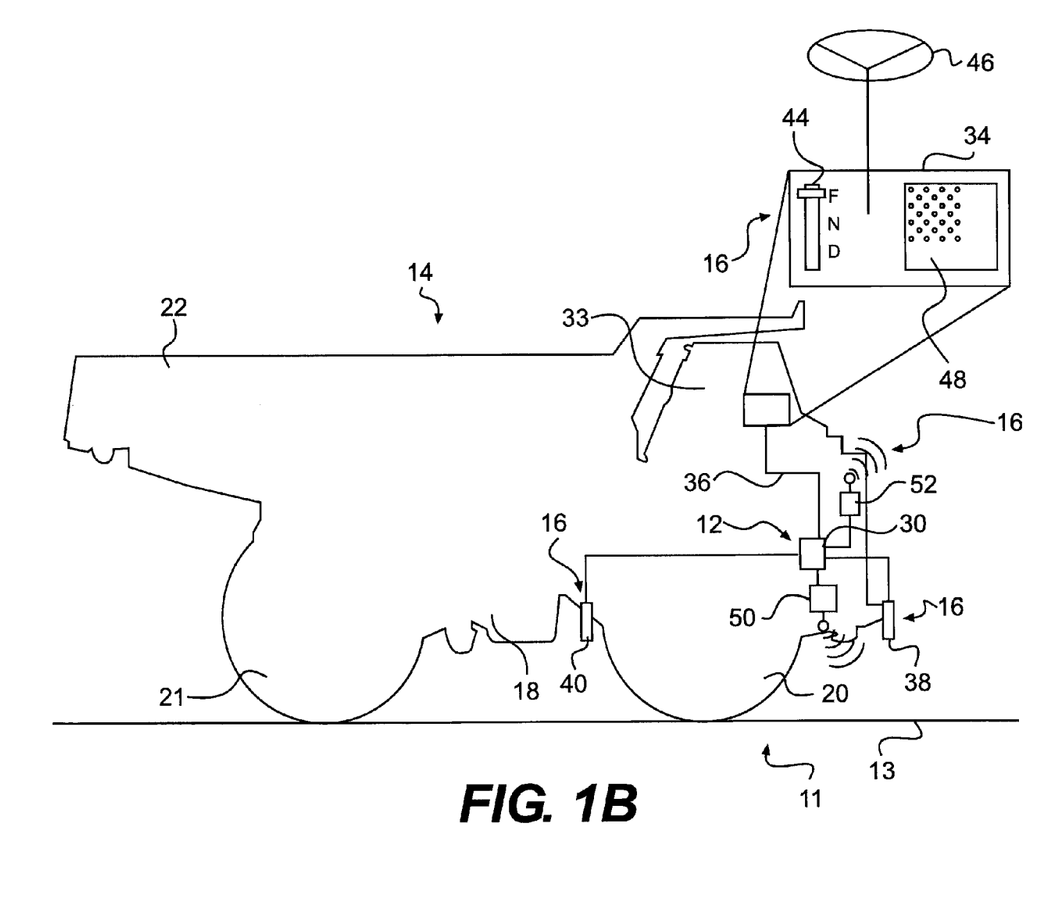
FIG. 1B provides an enlarged view of one of the mobile machines shown in FIG. 1A.
Figure 1C:
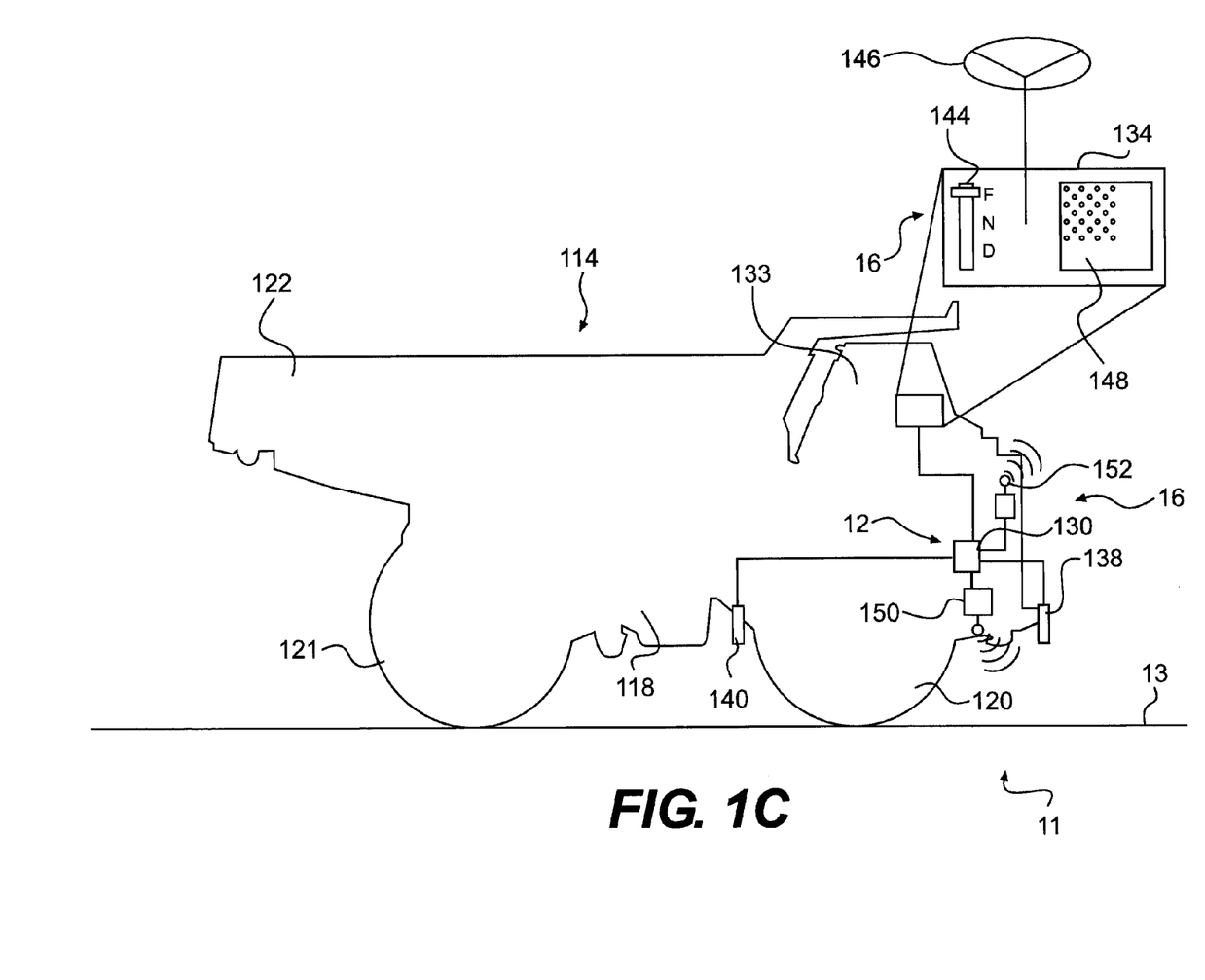
FIG. 1C provides an enlarged view of the other mobile machine shown in FIG. 1A.

FIGS. 1B and 1C provide enlarged views of mobile machine 14 and mobile machine 114, respectively. Each mobile machine 14, 114 may be a self-propelled mobile machine or a mobile machine configured to be propelled by another mobile machine that is self propelled. Mobile machines 14, 114 may each include a chassis 18, 118 supported from terrain surface 13. Each chassis 18, 118 may include one or more terrain-engaging components 20, 21, 120, 121 that move across terrain surface 13 as the mobile machine 14, 114 travels. For example, in the embodiments of mobile machines 14, 114 shown in FIGS. 1A-1C, terrain-engaging components 20, 21, 120, 121 are wheels. Terrain-engaging components 20, 21, 120, 121 may alternatively include one or more track units, runners, skids, or any other components suitable for moving across terrain surface 13 as mobile machines 14, 114 travel. In some embodiments, mobile machines 14, 114 may each also include a steering system (not shown) for controlling a direction in which each mobile machine 14, 114 travels across terrain surface 13. Additionally, in embodiments where a mobile machine 14, 114 is a self-propelled machine, the mobile machine 14, 114 may include a propulsion system (not shown).

Each mobile machine 14, 114 may be configured to be operated manually by an operator on mobile machine 14, 114, manually by an operator acting remote from mobile machine 14, 114, or autonomously under the control of one or more of information-processors 12. In the embodiment of mobile machines 14, 114 shown in FIGS. 1A-1C, each of mobile machines 14, 114 includes provisions for allowing control of the mobile machine 14, 114 by an operator on the mobile machine 14, 114, including an operator station 33, 133. Each operator station 33, 133 may include an operator interface 34, 134. Each operator interface 34, 134 may be connected to information-processors 12 by a communication line 36, 136. Each operator interface 34, 134 may include various components operable by the operator to communicate to the control system of the mobile machine 14, 114 how the operator desires the mobile machine 14, 114 to operate. For example, each operator interface 34, 134 may include a direction selector 44, 144 for communicating whether the operator desires propulsion of the mobile machine 14, 114 and, if so, in what direction (i.e., forward or reverse). Similarly, operator interface 34 may include a steering input 46, 146 (such as a steering wheel) with which the operator can transmit to the control system of the mobile machine 14, 114 what direction the operator desires to navigate the mobile machine 14, 114.

Each operator interface 34, 134 may also include one or more provisions for providing information back to the operator. For example, operator interface 34, 134 may have various conventional gauges and indicators, including, but not limited to, a speedometer, a tachometer, an hourmeter, pressure and temperature gauges, and warning lights. In some embodiments, operator interfaces 34, 134 may also include other provisions for communicating with the operator, such as display components 48, 148. Display components 48, 148 may be, for example, graphical display units.

Depending on the purpose(s) mobile machines 14, 114 are designed to serve, each mobile machine 14, 114 may include various other systems and components that help the mobile machine 14, 114 serve those purpose(s). For example, in the embodiment shown in FIGS. 1A-1C, mobile machines 14, 114 are hauling machines, and mobile machines 14, 114 include cargo bodies 22, 122 for hauling cargo. Mobile machines 14, 114 may additionally or alternatively include various other components configured to enable them to perform various other tasks, including, but not limited to, earthmoving, excavating, and/or loading implements.

Information-processors 12 of worksite-management system 10 may include any type of information-processing device(s) configured to perform one or more tasks relating to managing operation of mobile machines 14, 114 in connection with preparation of worksite 11. In some embodiments, each of information-processors 12 may include, for example, a computer having one or more memory devices and one or more microprocessor devices. One or more of information-processors 12 may be mounted to mobile machines 14, 114. For example, one of information-processors 12 may be a control module 30 mounted to mobile machine 14, and another of information-processors 12 may be a control module 130 mounted to mobile machine 114. Control module 30 may form part of an information system of mobile machine 14, and control module 130 may form part of an information system of mobile machine 114. The information systems of mobile machines 14, 114 may also include operator interfaces 34, 134 and various other information-processing and control components communicatively linked to control modules 30, 130, as discussed below. Additionally, or alternatively, one or more of information-processors 12 may be located off-board mobile machines 14, 114. For example, one of information-processors 12 may be a remote computer terminal 32.

Control modules 30, 130 may monitor and/or control various aspects of the operation of mobile machines 14, 114. For example, control modules 30, 130 may monitor and control various aspects of the operation of propulsion, steering, and implement systems of mobile machines 14, 114. In order to enable control modules 14, 114 to do so, control modules 30, 130 may be operably connected to various sensors and/or other control components of mobile machine 14, 114. Such sensors and control components may provide control modules 30, 130 with information related to operating parameters such as power production and losses in the propulsion systems of mobile machine 14, 114, the travel speed of mobile machines 14, 114, aspects of the operation of the steering systems of mobile machines 14, 114, information related to the payload or gross weight of mobile machines 14, 114, and the like. In addition to monitoring such operating parameters, control modules 30, 130 may, in some embodiments, record some or all of these parameters. In embodiments such as the one shown in FIGS. 1A-1C where mobile machines include operator interfaces 34, 134, control modules 30, 130 may also be operably connected to operator interfaces 34, 134, so that control modules 30, 130 may receive operator commands from and transmit operating information to the operators of mobile machines 14, 114 through operator interfaces 34, 134.

Each of mobile machines 14, 114 may also include provisions enabling control modules 30, 130 to monitor the location of mobile machines 14, 114. For example, each of mobile machines 14, 114 may include a global positioning (GPS) module 52, 152. Each GPS module 52, 152 may be communicatively linked to the associated control module 30, 130.

Remote computer terminal 32 may include one or more general-purpose or special-purpose computers from which individuals can monitor and manage one or more aspects of the operation of mobile machines 14, 114 in performing preparation of worksite 11. These computers may include one or more memory devices and one or more microprocessors. Additionally, remote computer terminal 32 may include a user interface 29 through which remote computer terminal 32 may receive information from and convey information to a user. User interface 29 may include a display component 31 and/or one or more other display components for communicating information to a user of remote computer terminal 32.

Remote computer terminal 32 may be located in various places and operated by various entities to perform various worksite-management tasks. In some embodiments, remote computer terminal 32 may be located at worksite 11. In other embodiments, remote computer terminal 32 may be maintained remote from worksite 11, such as at an offsite management facility. In some embodiments, remote computer terminal 32 may be owned and operated by an entity other than the owner of mobile machines 14, 114. For example, remote computer terminal 32 may be owned and operated by an entity contracted to provide consulting regarding management of worksite 11.

Remote computer terminal 32 may be operable to perform various worksite-management tasks related to the operation of mobile machines 14, 114 and/or other machines. For example, remote computer terminal 32 may be used to monitor, and in some cases record, the location and speed of mobile machines 14, 114 at various times, the type of work performed by machines 14 at various times, operating parameters of various systems (such as propulsion, steering, and implement systems) of mobile machine at various times, the payloads or gross weights of mobile machines 14, 114 at various times, and various other operating parameters of mobile machines 14, 114.

To enable remote computer terminal 32 to monitor, track, and manage various aspects of the operation of mobile machines 14, 114, information system 15 may include various components and/or systems that provide information to remote computer terminal 32 regarding one or more aspects of the operation of mobile machines 14, 114. For example, information system 15 may include communication links between remote computer terminal 32 and mobile machines 14, 114. The communication links between remote computer terminal 32 and mobile machines 14, 114 may be wireless communication links implemented with a transceiver 51 connected remote computer terminal 32 and transceivers 50, 150 mounted to mobile machines 14, 114. Transceivers 50, 150 may be communicatively linked to control modules 30, 130, respectively. Transceivers 50, 150 may be operable to transmit any information accessible by the controls of mobile machines 14, 114, such as control modules 30, 130, to remote computer terminal 32 and/or between control modules 30, 130 of mobile machines 14, 114. Such information may include, for example, information related to operating parameters such as power production and losses in the propulsion systems of mobile machines 14, 114, the travel speed and locations of mobile machines 14, 114, aspects of the operation of the steering systems of mobile machines 14, 114, information related to the payload or gross weight of mobile machines 14, 114, and the like.

As noted above, worksite-management system 10 may be configured to facilitate managing operation of mobile machines 14, 114 in one or more manners related to a state of compaction of terrain surface 13. To do so, worksite-management system 10 may perform a variety of tasks, including receiving information related to the state of compaction of terrain surface 13, analyzing such information, and executing one or more output functions that facilitate managing operation of mobile machines 14, 114 in a manner related to a state of compaction of terrain surface 13. The output functions may include, but are not limited to, providing information related to the state of compaction of various portions of terrain surface 13, providing recommendations for operating mobile machines 14, 114 to provide desired results, and/or providing automatic control of one or more aspects of the operation of mobile machines 14, 114 to provide desired results. Specifically, one or more of information-processors 12 may receive information from various inputs 16 of information system 15, one or more of information-processors 12 may process the information, and one or more of information-processors 12 may execute one or more of the output functions through user interfaces and/or control devices operably associated with information-processors 12. Examples of how worksite-management system 10 may execute such functions are discussed in detail below.

Information-processors 12, inputs 16, and the communication links of information system 15 may have any configuration operable to perform worksite-management tasks in the manners described herein. The tasks of receiving information and processing it may be performed by a single one of information-processors 12 or distributed in various ways among two or more of information-processors 12. The inputs 16 from which information-processors 12 receive information related to managing compaction may include a variety of components. In some cases, many of the sensors and control components conventionally used on mobile machines may serve as inputs 16 for the compaction-related tasks performed by worksite-management system 10. For example, sensors and control components providing information related to the operation of propulsion systems, steering systems, implement systems, and the like may provide information that worksite-management system 10 uses in performing tasks related to managing mobile machines 14, 114 in a manner related to a state of compaction of terrain surface 13. GPS modules 52, 152, operator interfaces 34, 134, and user interface 29 may also serve as inputs 16 of information related to compaction-management tasks.

Additionally, worksite-management system 10 may include various other components that serve as inputs 16 of information related to operation of mobile machines 14, 114 in a manner related to a state of compaction of terrain surface 13. In some embodiments, worksite-management system 10 may include inputs 16 configured to directly sense a state of compaction of terrain surface 13. For example, as shown in FIGS. 1A-1C, worksite-management system 10 may include sensors 38, 40 on mobile machine 14 and sensors 138, 140 on mobile machine 114. Sensors 38, 40, 138, and 140 may be configured to sense a distance to terrain surface 13. Sensors 38, 138 may be mounted ahead of terrain-engaging components 20, 120 of mobile machines 14, 114, such that sensors 38, 138 may sense a distance to a portion of terrain surface 13 not yet compacted by terrain engaging components 20, 120. Sensors 40, 140 may be mounted behind terrain-engaging components 20, 120, such that sensors 40, 140 may sense a distance to a portion of terrain surface 13 that has been travelled across and compacted by terrain-engaging components 20, 120. By providing information useable to determine how much terrain surface 13 compresses when terrain-engaging components 20, 120 travel across it, sensors 38, 40, 138, 140 provide a basis for directly determining a degree of compaction of that portion of terrain surface 13. Sensors 38, 40, 138, 140 may be communicatively linked to information-processors 12 in various ways. For example, in some embodiments, sensors 38, 40 may be communicatively linked to control module 30, and sensors 138, 140 may be communicatively linked to control module 130.

To help it perform various tasks related to managing compaction of terrain surface 13 by mobile machines 14, 114, worksite-management system 10 may also have various information and/or programs loaded in its information-processors 12. For example, each of control module 30, control module 130, and remote computer terminal 32 may have a digital map of terrain surface 13 loaded in memory. Additionally, one or more of information-processors 12 may have data stored in memory that represents a target compaction goal for terrain surface 13. Such a target compaction goal may be a uniform degree of compaction that it is desired to achieve for all of worksite 11, a map of different degrees of compaction that it is desired to achieve at different points in worksite 11, or any other description of the state of compaction that is desired for worksite 11. Furthermore, one or more of information-processors 12 may have stored in memory information identifying areas of terrain surface 13 that should not be traversed by mobile machines 14, 114 for any of a variety of reasons. The reasons that it may be desirable to avoid directing mobile machines 14, 114 across a given area may include, but are not limited to, the moisture content of the area, a need to perform other work (such as earthmoving) on the area, the inability of the terrain surface in the area to properly support mobile machines 14, 114, and a desire to avoid compacting the area with the mobile machines 14, 114. Information-processors 12 may also have various other data that they use in processing information about compaction of terrain surface 13 by mobile machines 14, including, but not limited to information about the weight and other characteristics of mobile machines 14, 114 and information about the material (s) forming terrain surface 13 and its properties.

Worksite-management system 10 may also be configured to coordinate management of other aspects of the preparation of worksite 11 with the management of mobile machines 14, 114 in manners related to the state of compaction of terrain surface 13. For example, worksite-management system 10 may be configured to coordinate earthmoving and material filling with management of compacting terrain surface 13.

The configuration and operation of worksite-management system 10 are not limited to the examples discussed above. For instance, worksite-management system 10 may include different numbers and/or configurations of non-compactor mobile machines. Additionally, in managing operation of mobile machines 14, 114 in a manner related to a state of compaction of terrain surface 13, worksite-management system 10 may manage one or more compactor machines in concert with managing non-compactor mobile machines 14, 114. Worksite-management system 10 may also have provisions other than sensors 38, 40, 138, and 140 for directly sensing a degree of compaction of terrain surface 13. In some embodiments, one or both of mobile machines 14, 114 may have an alternative sensing system for directly sensing a state of compaction of terrain surface 13. In other embodiments, mobile machines 14, 114 may omit sensors for directly sensing a state of compaction of terrain surface 13, and worksite-management system 10 may use another dedicated mobile machine or some other means for directly sensing a state of compaction of terrain surface 13. Alternatively, worksite-management system 10 may forego direct measurement of a state of compaction of terrain surface 13 altogether and rely on other information to manage compaction of terrain surface 13.

Worksite-management system 10 may also have a different number, configuration, and arrangement of information-processors 12. For example, in some embodiments, worksite-management system 10 may omit remote computer terminal 32 and rely exclusively on control modules 30, 130 to perform the worksite management. Alternatively, worksite-management system 10 may include additional remote computer terminals 32 that assist in facilitating management of compaction of terrain surface 13. Similarly, mobile machines 14, 114 may include additional information-processors that assist in facilitating management of compaction of terrain surface 13.

INDUSTRIAL APPLICABILITY

Worksite-management system 10 may have use in any application where it would prove useful to manage mobile machines in a manner related to a state of compaction of a terrain surface. Various worksite-preparation tasks undertaken primarily for purposes other than compacting the terrain surface of the worksite involve driving mobile machines across the terrain surface of the worksite. For example, earthmoving tasks may involve driving earthmoving equipment across terrain surface 13 of worksite 11. Similarly, worksite preparation may involve driving mobile machines 14, 114 across terrain surface 13 to haul material to and/or from various portions of worksite 11. While compacting terrain surface 13 does not constitute the primary purpose of mobile machines 14, 114 or other non-compactor mobile machines, driving such non-compactor mobile machines across terrain surface 13 does compact it.

Worksite-management system 10 may perform a variety of functions that help the developer of worksite 11 operate mobile machines 14, 114 more effectively based on information related to a state of compaction of terrain surface 13 while also achieving the primary objectives of mobile machines 14, 114. For example, worksite-management system 10 may help the developer operate mobile machines 14, 114 to provide desired compaction of certain areas of terrain surface 13, avoid undesired compaction of other areas of terrain surface 13, and otherwise achieve more refined operation of mobile machines 14, 114 based on information related to a state of compaction of various areas of terrain surface 13. The functions performed by worksite-management system 10 may include receiving information related to movement of mobile machines 14, 114 across terrain surface 13, processing this information, and executing one or more output functions based on the processed information to help the worksite developer use mobile machines 14, 114 to better operate mobile machines 14, 114.

Among other information, worksite-management system 10 may monitor and process information regarding where mobile machines 14, 114 have travelled and are travelling within worksite 11. In some embodiments, information-processors 12 of worksite-management system 10 may compile a complete history of all of the paths mobile machines 14, 114 have travelled across terrain surface 13. To facilitate navigation of mobile machines 14, 114 to achieve various goals related to compaction of worksite 13, worksite-management system 10 may communicate this history of travel paths to one or more individuals associated with managing operation of mobile machines 14, 114. This represents one way that information-processors 12 may communicate information related to compaction of terrain surface 13 as a function of the history of travel of mobile machine 14, 114 across terrain surface 13.

Figure 2A:
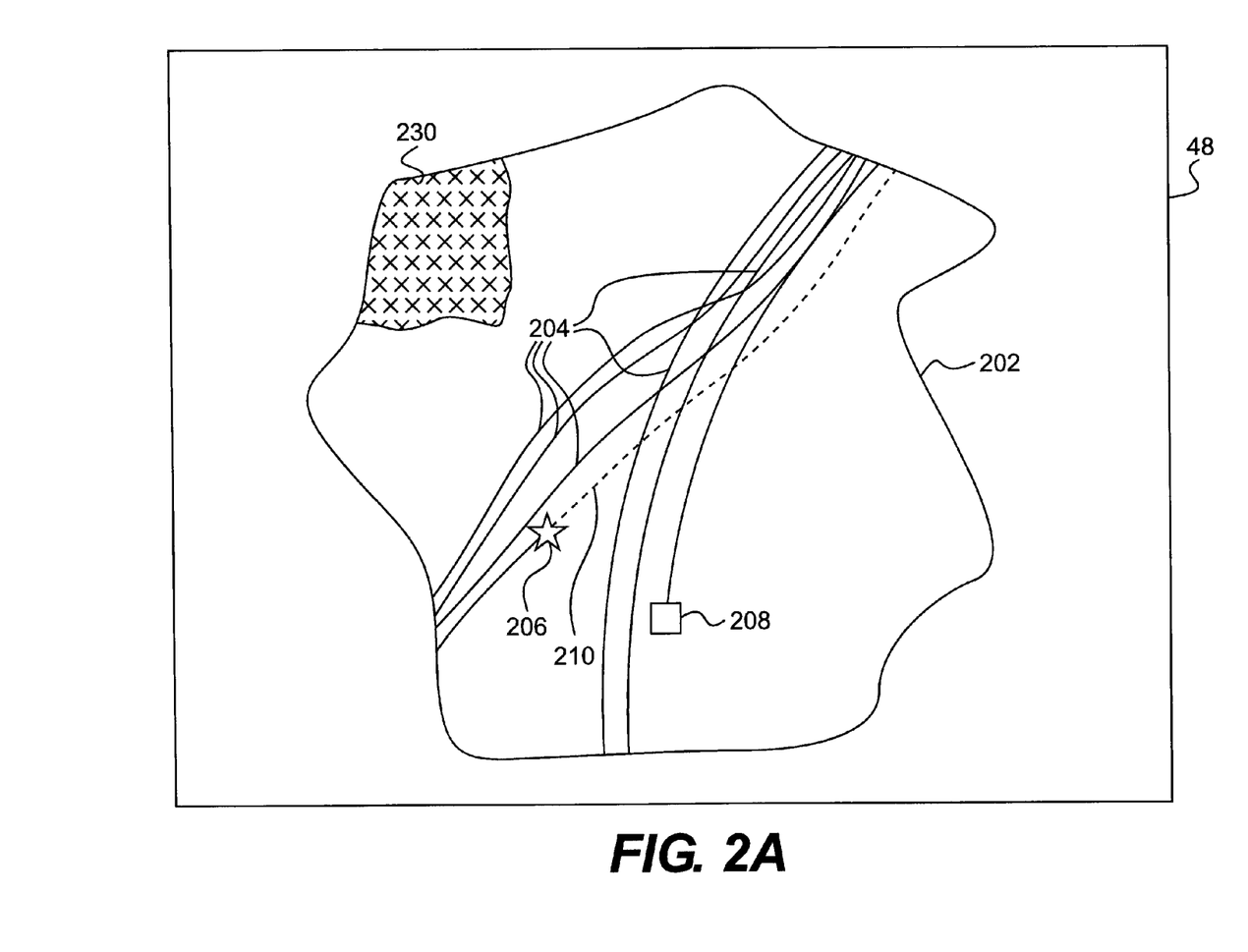
FIG. 2A illustrates one example of information related to compaction of a terrain surface as a result of mobile machine travel that may be presented on a display component.

For example, as FIG. 2A illustrates, information-processors 12 may present on display component 48 of mobile machine 14 a history of travel paths 204 that mobile machines 14, 114 have travelled within an area 202 of worksite 11. By presenting the operator of mobile machine 14 with this information about where mobile machines 14, 114 have previously travelled, information-processors 12 may help the operator determine where to navigate mobile machine 14. For example, in circumstances where a goal for the operation of mobile machines 14, 114 is to contribute to providing distributed compaction of terrain surface 13, the operator of mobile machine 14 may use the information about the travel history across terrain surface 13 to navigate mobile machine 14 in a manner to further compact terrain surface 13 (such as over portions of terrain surface 13 not yet travelled). To further assist the operator in navigating mobile machine 14, information-processors 12 may also provide information regarding the current position of mobile machine 14, mobile machine 114, and/or other machines and/or objects within worksite 11. For example, information-processors 12 may present on display component 48 an icon 206 representing the present location of mobile machine 14, as well as an icon 208 representing the present location of mobile machine 114. Information-processors 12 may further present the same or similar information on display component 148 of mobile machine 114 and/or display component 31 of remote computer terminal 32.

Figure 2B:
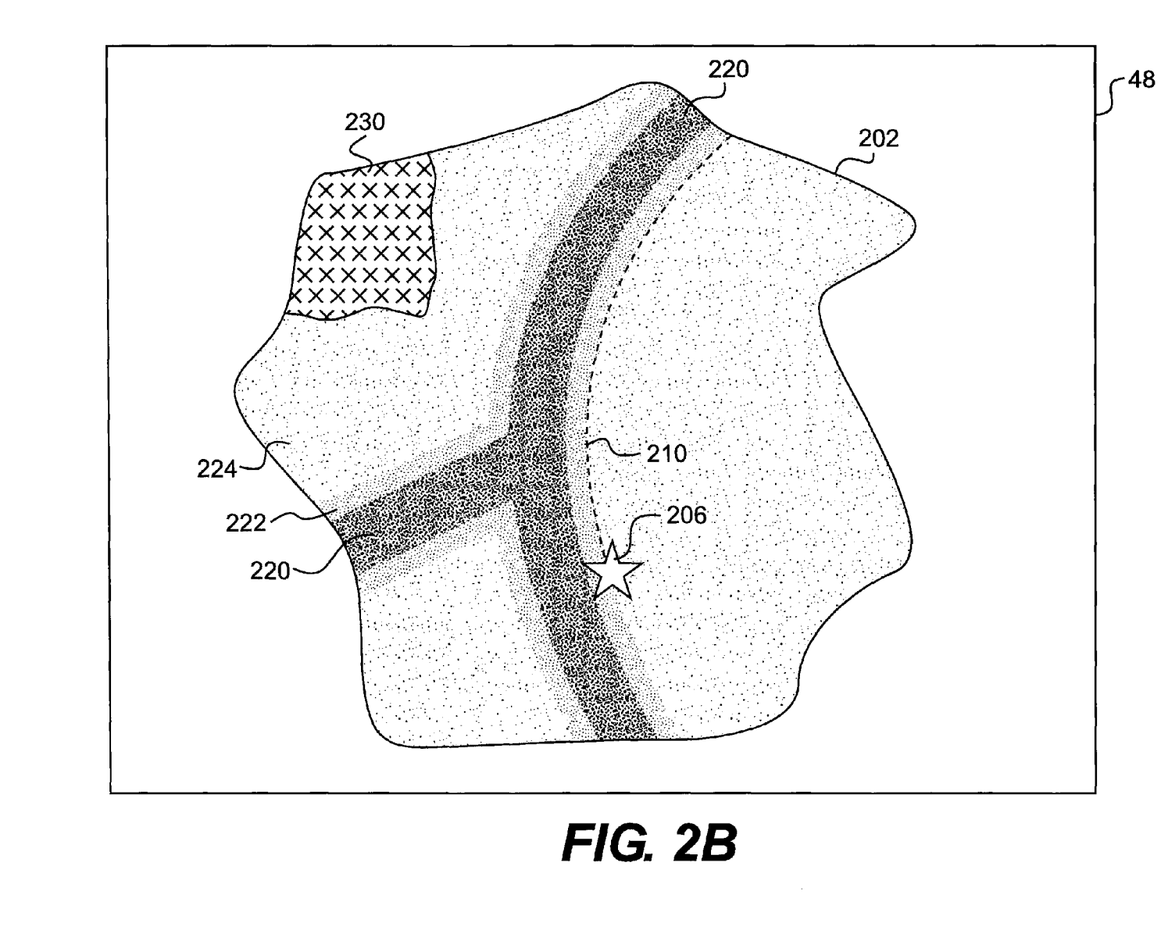
FIG. 2B illustrates one example of information related to compaction of a terrain surface as a result of mobile machine travel that may be presented on a display component.

Information-processors 12 may also convey other information to the operator(s) of mobile machines 14, 114. For example, as FIG. 2B shows, information-processors 12 may present on display component 48 an area 230 of worksite 11 that should be avoided. There may be various reasons that it may be desirable to avoid directing mobile machines 14, 114 across area 230. These reasons may include, but are not limited to, the moisture content of the terrain surface 13 in area 230, the compaction goal for area 230, a need to perform other tasks in area 230 (such as earthmoving) before further compacting it, and the inability of area 230 to properly support mobile machines 14, 114. By presenting area 230 on display component 48, worksite-management system 11 may allow the operator of mobile machine 14 to navigate mobile machine 14 in mariner to avoid area 230, thereby supporting whatever goal is served by not directing mobile machines 14, 114 across area 230.

Information-processors 12 may gather and process information like that presented in FIG. 2A in various ways. In some embodiments, the control module 30, 130 of each mobile machine 14, 114 may track the location of the mobile machine 14, 114 with its GPS module 52, 152. Using transceivers 50, 150, control modules 30, 130 may then transmit this location information continuously or periodically to remote computer terminal 32. Remote computer terminal 32 may then compile the information from mobile machines 14, 114 and/or any other mobile machines whose travel histories are known to produce a digital map of worksite 11 that includes an aggregate representation of all travel that has occurred across worksite 11. Using transceiver 51, remote computer terminal 32 may continuously or periodically communicate this digital map of travel histories to control modules 30, 130, which may then present the digital map on display components 48, 148 for use by the operators of mobile machines 14, 114. Alternatively, the processing and compilation of such information may be handled in various other ways. For example, in some embodiments, control modules 30, 130 may communicate with one another directly using transceivers 50, 150, and each control module 30, 130 may compile the information and present it to the operator via the associated display component 48, 148.

Worksite-management system 10 may also perform various other output functions that facilitate operation of mobile machines 14, 114 in a manner to achieve various goals based on a state of compaction of terrain surface 13. For example, referring again to FIG. 2A, information-processors 12 may plan a target travel path 210 for mobile machine 14. To do so, information-processors 12 may process a digital map stored in memory, information related to a compaction goal stored in memory, and the history of travel paths to plan target travel path 210. In embodiments and circumstances where it is desired for mobile machines 14, 114 to contribute to the general compaction goal for terrain surface 13, information-processors 12 may, for example, plan target travel path 210 with a bias toward directing mobile machine 14 over portions of terrain surface 13 needing further compaction, which may be, for example, portions of terrain surface 13 where relatively less machine travel has occurred.

Information-processors 12 may also factor in considerations related to other objectives when planning target travel path 210. Where mobile machine 14 is a hauling machine, mobile machine 14 may have to deliver its payload to a particular point or region of worksite 11. So, in such a circumstance, information-processors 12 may plan a target travel path 210 that ends at the required delivery location while traversing portions of worksite 11 that could benefit from additional compaction. In doing so, information-processors 12 may also take into account any compaction goals for terrain surface 13 of worksite 11. In planning target travel path 210, information-processors 12 may also avoid directing mobile machine 14 across certain areas, such as area 230. As noted above, areas like area 230 may be avoided for a variety of reasons.

In some embodiments, the planning of target travel path 210 may also take into consideration factors related to the performance of mobile machine 14. For example, in some embodiments, information-processors 12 may consider the effects of compaction of various areas of terrain surface 13 on the operation of mobile machine 14, such as the productivity and/or efficiency of mobile machine 14. This may involve planning target travel path 210 in a manner that partially or fully biases the navigation of mobile machine 14 toward areas of worksite 11 that may promote productivity and/or efficiency of mobile machine 14. This may involve information-processors 12 striking some compromise between directing mobile machine 14 to provide desired compaction and achieving desired productivity and/or fuel efficiency. Alternatively, information-processors 12 may plan target travel path 210 to provide desired compaction without regard to factors like productivity and efficiency. Or, information-processors 12 may plan target travel path 210 to promote one or more factors like productivity and/or efficiency without regard to providing desired compaction of terrain surface 13.

Worksite-management system 10 may use target travel path 210 in a variety of ways to facilitate operation of mobile machines 14, 114 to achieve various objectives related to a state of compaction of terrain surface 13. As shown in FIG. 2A, information-processors 12 may present target travel path 210 on display component 48, thereby providing a recommendation for the operator of mobile machine 14 to follow in steering the machine. Additionally, or alternatively, information-processors 12 may present target travel path 210 on display component 31 of remote computer terminal 32. This may help an individual at remote computer terminal 32 monitor overall operations of worksite 11. Additionally, in cases where mobile machine 14 is controlled remotely by an operator at remote computer terminal 32, displaying target travel path 210 on display component 32 may assist the operator in properly steering mobile machine 14. Furthermore, in some embodiments, worksite-management system 10 may control mobile machine 14 autonomously, including steering mobile machine 14 autonomously based on target travel path 210. Worksite-management system 10 and information-processors 12 may similarly plan and use target travel path(s) for mobile machine 114 and/or other mobile machines at worksite 11.

In addition to, or instead of, the approach reflected in FIG. 2A, worksite-management system 10 may manage one or more aspects of the operation of mobile machines 14, 114 based on quantitative estimates of a degree of compaction of various portions of terrain surface 13. As FIG. 2B illustrates, such an approach may, in some embodiments, involve presenting on display component 48 a graphical representation of an estimated degree of compaction of different portions of area 202 of terrain surface 13 in worksite 11 as a function of the history of travel of mobile machines 14, 114 within worksite 11. In the example shown in FIG. 2B, the darkest shading 220 represents portions of terrain surface 13 where the estimated degree of compaction is highest, the lightest shading 222 represents portions of terrain surface 13 where the estimated degree of compaction is lowest, and the intermediate shading 224 represents areas where the estimated degree of compaction is intermediate.

Worksite-management system 10 and information-processors 12 may use various approaches to estimate the degree of compaction of different portions of terrain surface 13. In some embodiments, worksite-management system 10 may rely at least in part on mobile machines 14, 114 to directly sense a state of compaction of various areas of terrain surface 13 as they travel across it. For example, control modules 30, 130 may gather information from sensors 38, 40, 138, and 140 as mobile machines 14, 114 travel across various portions of terrain surface 13. Control modules 30, 130 and/or remote computer terminal 32 may use this information by itself or in combination with other information to generate a digital map that includes an estimate of the degree of compaction of various portions of terrain surface 13. Additionally, or alternatively, information-processors 12 may use data from other types and/or arrangements of sensors on mobile machines 14, 114 and/or data collected with other machines or manually in generating a digital map that includes an estimate of a degree of compaction of various portions of terrain surface 13.

The estimated degree of compaction of various portions of terrain surface 13 may be used in a number of ways to facilitate controlling mobile machines 14, 114 in a manner to help achieve various goals related to a state of compaction of terrain surface 13. For example, in embodiments where information-processors 12 display this information on display component 48 of mobile machine 14, the operator thereof may use the information to steer mobile machine 14 to achieve various objectives based on the state of compaction of terrain surface 13. For example, where it is desired to operate mobile machine 14 to contribute to desired compaction of terrain surface 13, an operator of mobile machine 14 may use the information presented on display component 48 to steer mobile machine 14 to portions of terrain surface 13 that could benefit from additional compaction. To aid the operator in doing so, information-processors 12 may display an icon 206 indicating a current position of mobile machine 14 on terrain surface 13. Additionally, information-processors 12 may present similar information on display component 148 of mobile machine 114 and/or display component 31 of remote computer terminal 32 to facilitate effective navigation of mobile machine 114 and overall management of worksite 11. Furthermore, as with the approach discussed in connection with FIG. 2A, information-processors 12 may present on display component 48 an area 230 that should be avoided.

Similar to the approach discussed in connection with FIG. 2A, information-processors 12 may also plan a target travel path 210 based at least in part on an estimated degree of compaction of various portions of terrain surface 13. To do so, information-processors 12 may use a digital map of worksite 11 stored in memory, information related to a compaction goal for terrain surface 13, and the estimated current state of compaction of terrain surface 13. This may involve, for example, planning the target travel path with a bias toward directing mobile machine 14 over portions of terrain surface 13 having a relatively lower estimated degree of compaction. In doing so, information-processors may consider the degree of compaction relative to a compaction goal for the terrain surface 13. In other words, because the compaction goal for the terrain surface 13 may include higher target values of compaction for some areas than others, information-processors 12 may determine for various portions of terrain surface 13 the magnitude of a difference between the target degree of compaction and the estimated actual degree of compaction. Based on this calculation, information-processors 12 may plan target travel path 210 with a bias toward directing mobile machine 14 over portions of terrain surface exhibiting the highest compaction deficiencies relative to the compaction goal. Similarly, information-processors 12 may avoid directing mobile machine 14 over portions of terrain surface 13 exhibiting a sufficient or excessive degree of compaction, as well as portions of terrain surface like area 230 over which it may be desired to avoid machine traffic for a variety of reasons, such as those discussed above.

As discussed above in connection with FIG. 2A, when planning target travel path 210, information-processors 12 may also factor in considerations related to objectives other than compaction, such as directing mobile machine 14 to a designated delivery location and/or directing mobile machine 14 in a manner to promote productivity and/or efficiency. Various other factors may also be used in determining the target travel path 210. For example, information-processors 12 may also consider how the terrain surface 13 appears to be responding over time to the travel of mobile machines 14, 114 and other machines. If, for instance, it appears that the degree of compaction of a particular portion of terrain surface 13 is not increasing as expected when mobile machines 14, 114 travel across it, information-processors 12 may cease directing mobile machines 14, 114 across that area and direct them across other areas that may respond better. In such an event, information-processors 12 may also note the area(s) in which compaction is not increasing as expected due to machine travel. Information-processors 12 may also provide alerts to various people that these areas are not responding as expected, thereby allowing inspection of such areas.

As discussed above, information-processors 12 may use the target travel path 210 for mobile machine 14 and any other target travel paths in various ways. For example, information-processors 12 may present target travel path 210 on one or more of display components 48, 148, and 31 for use by individuals operating and/or monitoring mobile machine 14. Information-processors 12 may also autonomously control mobile machine 14 based on target travel path 210. Worksite-management system 10 and information-processors 12 may similarly determine and employ target travel path(s) for mobile machine 114 and/or other machines at worksite 11 based at least in part on the estimated degree of compaction of various portions of terrain surface 13.

Operation of worksite-management system 10 is not limited to the examples discussed above. In some embodiments, worksite-management system may employ elements of the approach discussed in connection with FIG. 2A together with elements of the approach discussed in FIG. 2B. Additionally, worksite-management system 10 may receive and process various other types of information and/or algorithms to provide guidance and/or automated control for operating mobile machines 14, 114 in a manner to promote various objectives related to a state of compaction of terrain surface 13.

The disclosed worksite-management system 10 and methods may provide significant advantages in managing preparation of a worksite. By allowing the worksite developer to more effectively operate non-compactor mobile machines based on a state of compaction of terrain surface 13, worksite-management system 10 may allow the developer to achieve a number of objectives. For example, worksite-management system may allow the developer to operate mobile machines 14, 114 to assist in providing desired compaction of the terrain surface. This may enable the developer to achieve better compaction of the worksite more quickly and economically. Additionally, worksite-management system 10 may reduce the need for the worksite developer to use dedicated compactor machines. On some jobs, worksite-management system 10 may even eliminate any need for dedicated compactor machines altogether. Furthermore, worksite-management system 10 may help the developer to avoid undesirably compacting certain areas of worksite 11, as well as to avoid having one or more of mobile machines 14, 114 become mired in soft areas of worksite 11. In concert with, or separate from these advantages, worksite-management system 10 may allow navigating mobile machines 14, 114 based on information related to compaction of terrain surface 13 to promote productivity and/or efficiency of mobile machines 14, 114.

It will be apparent to those skilled in the art that various modifications and variations can be made in the disclosed worksite-management system without departing from the scope of the disclosure. Other embodiments of the disclosed worksite-management system will be apparent to those skilled in the art from consideration of the specification and practice of the worksite-management system disclosed herein. It is intended that the specification and examples be considered as exemplary only, with a true scope of the disclosure being indicated by the following claims and their equivalents.

What is claimed is:

1. A worksite-management system, comprising:
   a display component; and
   one or more information-processors configured to
   acquire information about a history of travel of one or more non-compactor mobile machines across a terrain surface of a worksite,
   process the acquired information to generate a digital map indicative of compaction of the terrain surface as a function of the history of travel of the one or more non-compactor mobile machines across the terrain surface, and
   present on the display component information related to the compaction of the terrain surface as a function of the history of travel of the one or more non-compactor mobiles across the terrain surface including an estimated degree of compaction in different portions of the worksite.

2. The worksite-management system of claim 1, wherein the information presented on the display component includes paths that the one or more non-compactor mobile machines have traversed within the worksite.

3. The worksite management system of claim 1, wherein the one or more non-compactor mobile machines includes at least one of a hauling machine, an earthmoving machine, an excavator, and a loader.

4. The worksite-management system of claim 1, wherein the display component is located in an operator station of one of the one or more non-compactor mobile machines.

5. The worksite management system of claim 1, wherein:
   the one or more non-compactor mobile machines include a first non-compactor mobile machine and a second non-compactor mobile machine;
   the display component is located in an operator station of the first non-compactor mobile machine; and
   presenting on the display component information related to the compaction of the terrain surface as a function of the history of travel of the one or more non-compactor mobile machines across the terrain surface includes presenting on the display component a representation of at least one path that the second non-compactor mobile machine has travelled across the terrain surface of the worksite.

6. The worksite management system of claim 1, wherein the one or more information-processors are further configured to plan a target travel path for at least one of the one or more non-compactor mobile machines based on the history of travel of the one or more non-compactor mobile machines.

7. The worksite management system of claim 1, wherein the one or more information-processors are further configured to
   estimate a degree of compaction of one or more portions of the terrain surface of the worksite, and
   plan a target travel path for at least one of the one or more non-compactor mobile machines based at least in part on the estimated degree of compaction.

8. A method of managing compaction of a worksite, comprising:
   providing in memory of one or more information-processors
   a digital map of a terrain surface of the worksite,
   information related to a compaction goal for the terrain surface,
   information related to a current state of compaction of the terrain surface including an estimate of degrees of compaction at different portions of the terrain surface; and
   using the one or more information-processors to process the digital map, the information related to the compaction goal for the terrain surface, and the information related to the current state of compaction of the terrain surface to plan a target travel path across the terrain surface for a non-compactor mobile machine with a bias to direct the non-compactor machine across portions of the terrain surface where there exists a relatively greater disparity between the estimated degree of compaction and the compaction goal.

9. The method of claim 8, further including presenting the planned target travel path on a display component.

10. The method of claim 8, wherein planning the target travel path for the mobile machine includes planning the target travel path to avoid at least one area of the terrain surface across which it is undesirable to have the mobile machine travel.

11. The method of claim 8, wherein the non-compactor mobile machine is at least one of a hauling machine, an earthmoving machine, an excavator, and a loader.

12. The method of claim 8, wherein planning the target travel path includes planning the target travel path based at least in part on at least one operating objective other than compaction of the terrain surface.

13. A mobile machine, comprising:
a chassis supported from a terrain surface underlying the mobile machine, wherein the mobile machine is a non-compactor mobile machine; and
an information system configured to generate information related to compaction of the terrain surface by the non-compactor mobile machine, the information system including
memory with a digital map of the terrain surface,
a positioning module for acquiring information identifying a position of the non-compactor mobile machine on the terrain surface, and
one or more processors configured to use the digital map of the terrain surface and the information identifying the position of the non-compactor mobile machine to generate information related to compaction of the terrain surface resulting from travel of the non-compactor mobile machine across the terrain surface, and to plan a target travel path of the mobile machine based on the generated information.

14. The mobile machine of claim 13, wherein:
the memory of the information system also has stored therein information about a compaction goal for the terrain surface; and
the processor is further configured to plan a target travel path for the mobile machine based at least in part on the information related to compaction of the terrain surface resulting from travel of the non-compactor mobile machine across the terrain surface and the compaction goal.

15. The mobile machine of claim 13, wherein:
the information system includes a display component located in an operator station of the mobile machine; and
the information system is configured to present on the display component the information related to a state of compaction of the terrain surface.

16. The mobile machine of claim 13, wherein the mobile machine is at least one of a hauling machine, an earthmoving machine, an excavator, and a loader.

17. A method of managing compaction of a worksite, comprising:
providing in memory of one or more information-processors,
a digital map of a terrain surface of the worksite,
information related to a compaction goal for the terrain surface,
information related to a current state of compaction of the terrain surface including information about a history of travel across the terrain surface; and
using the one or more information-processors to process the digital map, the information related to the compaction goal for the terrain surface, and the information related to the current state of compaction of the terrain surface to plan a target travel path across the terrain surface for a non-compactor mobile with a bias to direct the non-compactor mobile machine across portions of the terrain surface where relatively less travel has occurred.

18. The method of claim 17, wherein planning the target travel path includes planning the target travel path based at least in part on at least one operating objective other than compaction of the terrain surface.

19. The method of claim 17, further including presenting the planned target travel path on a display component.

20. The method of claim 17, wherein planning the target travel path for the mobile machine includes planning the target travel path to avoid at least one area of the terrain surface across which it is undesirable to have the mobile machine travel.

21. A worksite-management system, comprising:
a display component; and
one or more information-processors configured to
acquire information about a history of travel of one or more non-compactor mobile machines across a terrain surface of a worksite,
process the acquired information to generate a digital map indicative of compaction of the terrain surface as a function of the history of travel of the one or more non-compactor mobile machines across the terrain surface;
present on the display component information related to the compaction of the terrain surface as a function of the history of travel of the one or more non-compactor mobiles across the terrain surface; and
plan a target travel path for at least one of the one or more non-compactor mobile machines based on the history of travel of the one or more non-compactor mobile machines.

22. The worksite management system of claim 21, wherein the display component is located in an operator station of one of the one or more non-compactor mobile machines.

* * * * *